(12) United States Patent
Yang

(10) Patent No.: US 11,303,788 B2
(45) Date of Patent: Apr. 12, 2022

(54) ELECTRONIC DEVICE AND CAMERA MODULE THEREOF

(71) Applicant: VIVO MOBILE COMMUNICATION CO., LTD., Guangdong (CN)

(72) Inventor: Jun Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 9 days.

(21) Appl. No.: 16/767,083

(22) PCT Filed: Nov. 12, 2018

(86) PCT No.: PCT/CN2018/115011
§ 371 (c)(1),
(2) Date: May 26, 2020

(87) PCT Pub. No.: WO2019/100962
PCT Pub. Date: May 31, 2019

(65) Prior Publication Data
US 2020/0322513 A1    Oct. 8, 2020

(30) Foreign Application Priority Data

Nov. 27, 2017 (CN) .......................... 201711212206.0

(51) Int. Cl.
*H04N 5/225* (2006.01)
(52) U.S. Cl.
CPC ......... *H04N 5/2257* (2013.01); *H04N 5/2253* (2013.01)

(58) Field of Classification Search
CPC ... H04N 5/2257; H04N 5/2253; H04N 5/2251
See application file for complete search history.

(56) References Cited

U.S. PATENT DOCUMENTS

| 6,603,183 | B1 | 8/2003 | Hoffman | |
|---|---|---|---|---|
| 7,521,770 | B2* | 4/2009 | Wu | ....... H04N 5/2254 257/432 |
| 8,310,036 | B2* | 11/2012 | Haba | ....... H01L 24/05 257/678 |

(Continued)

FOREIGN PATENT DOCUMENTS

| CN | 2773722 Y | 4/2006 |
|---|---|---|
| CN | 1980325 A | 6/2007 |

(Continued)

OTHER PUBLICATIONS

European Search Report in Application No. 18881117.8 dated Sep. 23, 2020.

(Continued)

*Primary Examiner* — Seung C Sohn
(74) *Attorney, Agent, or Firm* — Maschoff Brennan

(57) ABSTRACT

The invention provides a camera module of an electronic device, which includes a circuit board, a chip, an image sensor and a connection frame. The chip is arranged on the circuit board, and the image sensor is arranged on the chip. The connection frame is arranged on the periphery of the chip, and the chip is electrically connected with the circuit board by the connection frame, and the image sensor is located in the space surrounded by the connection frame. The invention also provides an electronic device.

7 Claims, 2 Drawing Sheets

(56) References Cited

U.S. PATENT DOCUMENTS

| | | | |
|---|---|---|---|
| 8,575,712 B2* | 11/2013 | Vigier-Blanc | H01L 27/14618 257/432 |
| 11,161,291 B2* | 11/2021 | Wang | H05K 3/284 |
| 2005/0196982 A1 | 9/2005 | Cao et al. | |
| 2007/0040932 A1 | 2/2007 | Chen | |
| 2007/0126081 A1 | 6/2007 | Webster et al. | |
| 2019/0079262 A1 | 3/2019 | Wang et al. | |

FOREIGN PATENT DOCUMENTS

| | | |
|---|---|---|
| CN | 202652307 U | 1/2013 |
| CN | 203313284 U | 11/2013 |
| CN | 105280664 A | 1/2016 |
| CN | 107071238 A | 8/2017 |
| CN | 107888812 A | 4/2018 |
| EP | 2 276 233 A1 | 1/2011 |
| KR | 100817143 B1 | 3/2008 |
| KR | 20100020614 A | 2/2010 |
| KR | 20110039111 A | 4/2011 |
| TW | 200531359 A | 9/2005 |
| WO | 2017071561 A1 | 5/2017 |

OTHER PUBLICATIONS

Written Opinion in Application No. PCT/CN2018/115011 dated Jun. 11, 2020.

\* cited by examiner

ELECTRONIC DEVICE AND CAMERA MODULE THEREOF

CROSS-REFERENCE TO RELATED APPLICATION

This application is the U.S. national phase of PCT Application No. PCT/CN2018/115011 filed on Nov. 12, 2018, which claims priority to Chinese Patent Application No. 201711212206.0 filed on Nov. 27, 2017, the disclosures of which are incorporated in their entirety by reference herein.

TECHNICAL FIELD

The present disclosure relates to the field of electronic device design technologies, and in particular to an electronic device and a camera module of the electronic device.

BACKGROUND

With the improvement of user requirements, full screen technology has become a development direction for more and more display screens of electronic devices. Since an area increase of the display screens may lead to a smaller frame area of the electronic device, the installation space of functional components arranged on the frame is narrowed, higher requirements have been proposed to the designers about how to arrange the functional components better.

Many electronic devices have the function of video recording, which is accomplished by a camera module of the electronic device. The camera module is typically arranged on a frame of the electronic device. As the area of the frame of the electronic device becomes smaller, the size of the camera module needs to have a reduced size.

In order to reduce the size of the camera module, the common design mode is to cancel a base used for installing a camera in the camera module. Since the base is cancelled, wires connecting a chip of the camera module and a circuit board are exposed to external environment, and further damage is easy to occur. To protect these wires, manufacturers typically perform glue injection to the wires connecting the chip and the circuit board. However, the glue injection process is easy to produce dust, which may further contaminate the image sensor disposed on the chip, and finally the yield of the camera module is low.

SUMMARY

The embodiment of the disclosure provides a camera module of an electronic device, and adopts the following technical solutions.

The camera module of the electronic device includes circuit board, a chip, an image sensor and a connection frame, the chip is arranged on the circuit board, the image sensor is arranged on the chip, the connection frame is arranged on the periphery of the chip, and the chip is electrically connected with the circuit board by the connection frame, the image sensor is located in the space surrounded by the connection frame. Optionally, in the camera module, the connection frame includes a frame body and an electrical connection part disposed on the frame body, and the electrical connection part is electrically connected with the chip and the circuit board. Optionally, in the camera module, the frame body includes an enclosure frame and a lap edge arranged at the top of the enclosure frame, the lap edge extends in a direction close to the axis of the enclosure frame, the enclosure frame is arranged on the periphery of the chip, and the lap edge is lapped on a top surface of the chip, the top surface is away from the circuit board.

Optionally, in the above camera module, the electrical connection part is a lead wire affixed on the inner wall of the frame body, pins of one end of the lead wire are arranged on the lap edge, and pins of the other end of the lead wire are arranged between the bottom end of the enclosure frame and the circuit board.

Optionally, in the above camera module, the bottom end of the enclosure frame and the circuit board are fixedly connected by a conductive adhesive layer, and the conductive adhesive layer is electrically connected with the pins at the other end of the lead wire.

Optionally, in the camera module, the pins at one end of the lead wire are connected with the chip through gold bump welding.

Optionally, in the camera module, an adhesive connection layer is filled between the inner wall of the enclosure frame and the side wall of the chip.

Optionally, in the camera module, the bottom surface of the chip is fixedly connected with the circuit board through an insulating adhesive layer.

Optionally, in the above-mentioned camera module, the camera module includes a camera, and the camera is installed on the top of connection frame.

An electronic device includes any one of the above camera module.

BRIEF DESCRIPTION OF THE DRAWINGS

The drawings described herein are provided for further understanding of the present disclosure, and form a part of the present disclosure. Exemplary embodiments and description thereof of the present disclosure are intended for interpretation of the present disclosure, but do not make improper limitation to the present disclosure. In the drawings.

REFERENCE NUMERALS

100—circuit board, 200—chip, 300—image sensor, 400—connection frame, 410—frame body, 411—enclosure frame, 412—lap edge, 420—electrical connection part, 500—insulating adhesive layer, 10—camera module, 510—conductive adhesive layer, 520—adhesive connection layer, 700—camera.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Figure 1:
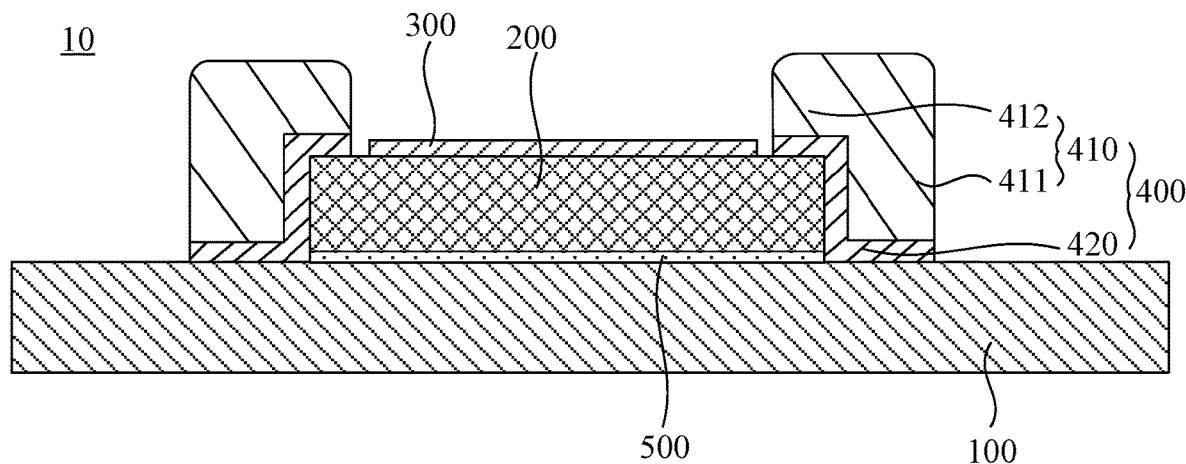
FIG. 1 is a sectional view of the camera module of the electronic device disclosed in an embodiment of the present disclosure.

The technical solutions provided by the embodiments of the present disclosure will be described in detail below in conjunction with the accompanying drawings. Referring to FIG. 1, an embodiment of the present disclosure discloses a camera module 10 of an electronic device 1, comprising a circuit board 100, a chip 200, an image sensor 300 and a connection frame 400.

The circuit board 100 is the base of the camera module 10 and supplies power for the camera module 10. In general, the circuit board 100 may be a motherboard of an electronic device or a circuit board independent of the motherboard of the electronic device.

The image sensor 300 is a photosensitive component of the camera module 10 for collecting optical signals that forms an image. The image sensor 300 is arranged on the chip 200, and the chip 200 can perform subsequent processing according to the optical signals collected by the image sensor 300. The chip 200 is arranged on the circuit board 100.

In the present disclosure, the connection frame 400 is arranged on the chip 200 for electrically connecting the chip 200 and the circuit board 100. The image sensor 300 is located in a space surrounded by the connection frame 400.

The camera module 10 provided in the present disclosure realizes the electrical connection between the chip 200 and the circuit board 100 through the connection frame 400 arranged on the periphery of the chip 200, and separated wires are not needed to connect the chip 200 and the circuit board 100. There is no need to use glue injection to protect the wires, thereby contamination to the image sensor during the glue injection process can be avoided. It can be seen that the camera module 10 disclosed in the embodiment of the present disclosure can improve the yield of production.

The structure of the connection frame 400 can be various. Referring to FIG. 1 again, in an embodiment, the connection frame 400 may include a frame body 410 and an electrical connection part 420 disposed on the frame body 410. The electrical connection part 420 is used for electrically connecting the chip 200 and the circuit board 100. The frame body 410 is a mechanical connecting part of the connection frame 400 and also provides a layout space for the electrical connection part.

In an embodiment, the frame body 410 includes an enclosure frame 411 and a lap edge 412 arranged at the top of the enclosure frame 411. The lap edge 412 is arranged at the top of the enclosure frame 411, and the lap edge 412 extends in a direction close to the axis of the enclosure frame 411. The enclosure frame 411 is arranged on the periphery of the chip 200, and the lap edge 412 is lapped on the top surface of the chip 200, the top surface is away from the circuit board 100.

The enclosure frame 411 surrounds the outside of the chip 200 and can protect the chip 200. The lap edge 412 is lapped on the top surface of the chip 200, by means of the lap edge 412 and the frame body 410, the chip 200 can be stably installed.

It should be noted that in the present disclosure, the enclosure frame 411 includes a top end and a bottom end, the bottom end of the enclosure frame 411 is connected to the circuit board 100, the top end of the enclosure frame 411 is one end of the enclosure frame 411 away from the chip 200, and the bottom end of the enclosure frame 411 is located between the top end and the circuit board 100. The chip 200 has a top surface and a bottom surface, the bottom surface of the chip 200 is close to the circuit board 100, and the top surface of the chip 200 is away from the circuit board 100.

Figure 2:
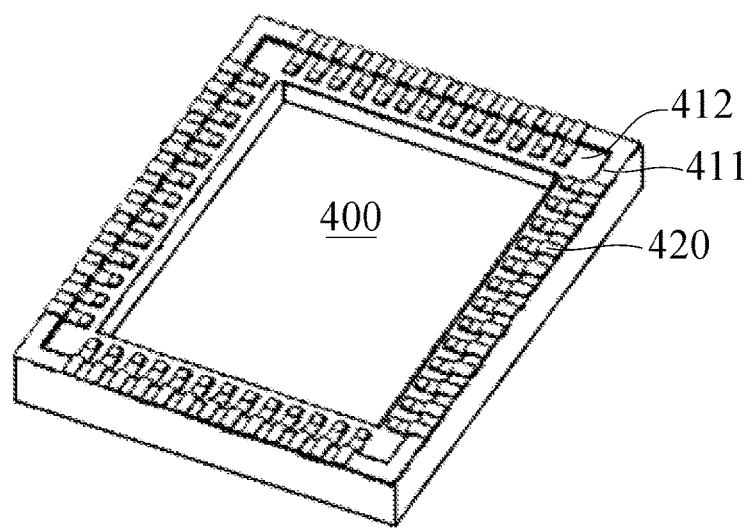
FIG. 2 and FIG. 3 are schematic structural diagrams showing the connection frame provided by the present disclosure at different viewing angles respectively.
Figure 3:
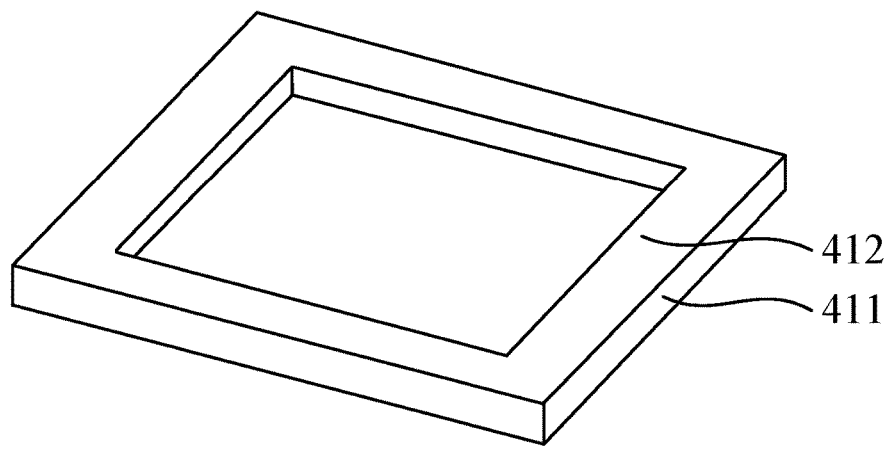

Referring to FIGS. 2 and 3, in an embodiment, the electrical connection part 420 is a lead wire affixed on the inner wall of the frame body 410. The pins at one end of the lead wire are arranged on the lap edge 412, and the pins at the other end are arranged between the enclosure frame 411 and the circuit board 100. There are usually multiple leads, and the pins at one end of the multiple leads are arranged on the lap edge 412, which can be connected with the electronic components densely distributed on the chip 200 and achieve good connection effect.

The lead wire is usually made of metal members. Specifically, the lead wire can include a copper substrate and a nickel-gold alloy layer plated on the copper substrate, the copper substrate can ensure the overall strength of the lead, and the nickel-gold alloy layer has good electrical conductivity, so that the lead has good conductive effect. During assembly process, the pins at one end of the lead can be electrically connected to the chip 200 by plug, and of course other connection methods can be used to realize the connection. For example, the lead wire and the chip 200 may be connected by gold bump welding, and ultrasonic welding process can be used to improve the welding quality.

Figure 4:
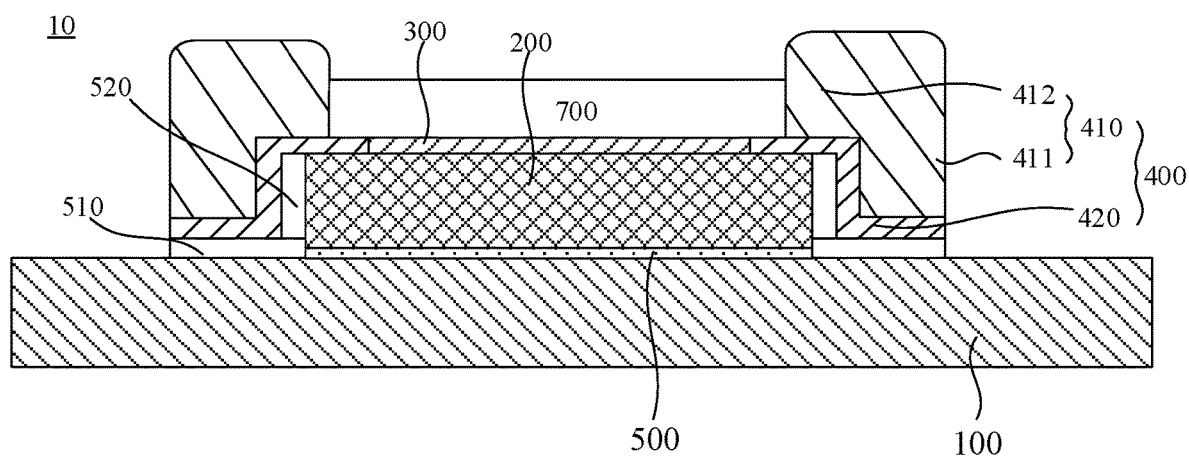
FIG. 4 is a sectional view of the camera module of the electronic device disclosed in another embodiment of the present disclosure.

As shown in FIG. 4, the bottom end of the enclosure frame 411 and the circuit board 100 can be fixedly connected by a conductive adhesive layer 510. The conductive adhesive layer 510 is electrically connected with the pin at the other end of the lead wire. The conductive adhesive layer 510 can realize the fixed connection between the bottom end of the enclosure frame 411 and the circuit board 100, and also improve the stability of the conductive connection.

An adhesive connection layer 520 can be filled between the inner wall of the enclosure frame 411 and the side wall of the chip 200, and the adhesive connection layer 520 can further improve the connection stability between the connection frame 400 and the chip 200, while protecting the lead wires passing through the inner wall of the enclosure frame 411.

In the present disclosure, the circuit board 100 may be a PCB (Printed Circuit Board) or a FPC (Flexible Printed Circuit), and the circuit board 100 may be conveniently arranged in the case that the circuit board 100 is FPC. In general, the bottom surface of the chip 200 is a connecting surface, and in order to improve the stability of connection, the bottom surface of the chip 200 and the circuit board 100 can be permanently connected by an insulating adhesive layer 500.

In the disclosed embodiment, the enclosure frame 411 may be a ceramic frame made of ceramic material, a silicon frame made of silicon material, or a resin frame made of resin material. The enclosure frame 411 may also be made of a fire-resistant material, such as a FR4 enclosure made of FR4 material. The specific material of the enclosure 411 is not limited in the present disclosure.

As described above in the camera module 10 provided in the present disclosure, the connection frame 400 can not only realize the electrical connection between the chip 200 and the circuit board 100, but also realize the fixation of the chip 200. The camera module 10 disclosed in the disclosed embodiment also includes a camera 700, which can be installed on the top of the connection frame 400. In this case, the connection frame 400 can also provide installation positions for the camera 700 to realize assembly of the camera.

Based on the camera module disclosed in the embodiment of the present disclosure, the present disclosure also discloses an electronic device, which includes the camera module described in any of the above embodiments.

The electronic devices disclosed in the embodiment may be devices such as mobile phones, tablet computers, etc., and the present embodiments do not limit the specific types of electronic devices.

The above embodiments of this disclosure focus on the differences between the various embodiments, and the different features between the embodiments can be combined to form better embodiments as long as they are not contradictory, which is not repeated herein.

The above are merely the exemplary embodiments of this disclosure, the present disclosure is not limited thereto. For those skilled in the art, various modifications and improvements may be made. Various modifications, equivalent replacements and improvements may be made within the spirit and essence of this disclosure, and these modifications and improvements may also fall into the scope of the present disclosure.

What is claimed is:

1. A camera module of an electronic device, comprising a circuit board, a chip, an image sensor and a connection frame, wherein the chip is arranged on the circuit board, the image sensor is arranged on the chip, the connection frame is arranged on the periphery of the chip, the chip is electrically connected with the circuit board by the connection frame, and the image sensor is located in the space surrounded by the connection frame;

wherein the connection frame comprises a frame body and an electrical connection part arranged on the frame body, and the electrical connection part is electrically connected with the chip and the circuit board;

wherein the frame body comprises an enclosure frame and a lap edge arranged at the top of the enclosure frame, the lap edge extends in a direction close to the axis of the enclosure frame, the enclosure frame is arranged on the periphery of the chip, and the lap edge is lapped on a top surface of the chip, the top surface is away from the circuit board; and wherein the electrical connection part is a lead wire affixed on the inner wall of the frame body, pins of one end of the lead wire are arranged on the lap edge, and pins of the other end of the lead wire are arranged between the bottom end of the enclosure frame and the circuit board.

2. The camera module according to claim 1, wherein the bottom end of the enclosure frame and the circuit board are fixedly connected by a conductive adhesive layer, and the conductive adhesive layer is electrically connected with the pins at the other end of the lead wire.

3. The camera module according to claim 1, wherein the pins at one end of the lead wire are connected with the chip through gold bump welding.

4. The camera module according to claim 1, wherein an adhesive connection layer is filled between the inner wall of the enclosure frame and the side wall of the chip.

5. The camera module according to claim 1, wherein the bottom surface of the chip is fixedly connected with the circuit board through an insulating adhesive layer.

6. The camera module according to claim 1, wherein the camera module further comprises a camera installed on the top of the connection frame.

7. An electronic device, comprising the camera module according to claim 1.

* * * * *